May 14, 1963   K. H. WILMS   3,089,398
OPHTHALMIC CAMERAS
Filed July 12, 1960
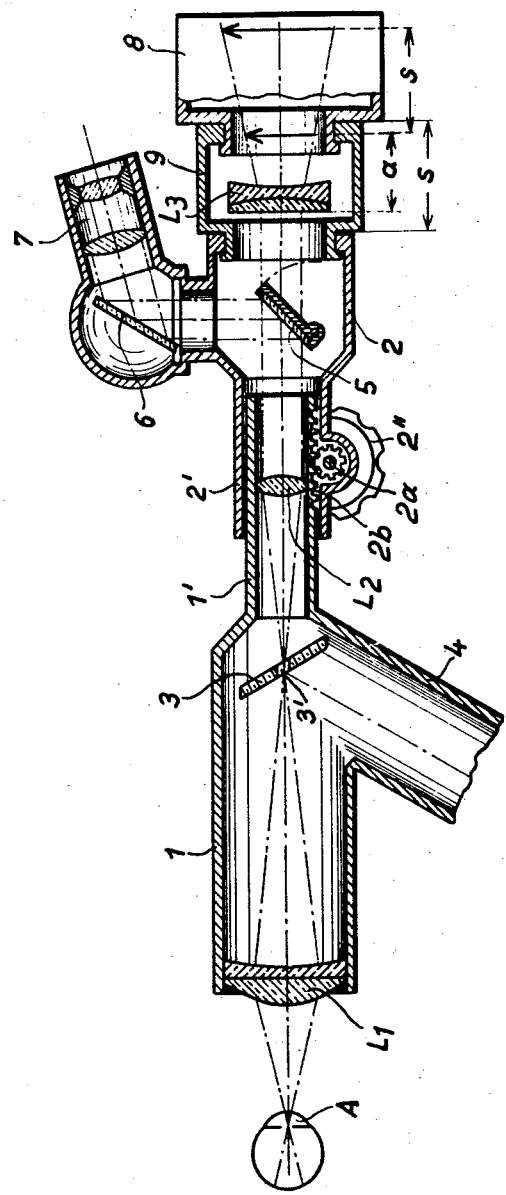

3,089,398
OPHTHALMIC CAMERAS
Karl Heinz Wilms, Oberkochen, Wurttemberg, Germany, assignor to Carl Zeiss, Oberkochen, Wurttemberg, Germany
Filed July 12, 1960, Ser. No. 42,260
Claims priority, application Germany July 21, 1959
4 Claims. (Cl. 95—11)

The invention relates to an ophthalmic camera particularly for photographing the retina of the human eye, and in which is employed a photographic objective with two lenses or lens groups. The objective is designed and arranged in such a manner that the image of the pupil of the eye which is produced by the front system coincides with the focal point of the rear system. With such a photographic objective is produced a parallel ray image beam. This permits the solution of the problem of retaining the relation between any optical angle and the corresponding lateral distance on a light-sensitive layer independently of the deficiency of sight of the eye to be photographed.

It is often desirable to change the picture scale of the photographic objective and in particular to increase same. For this purpose a supplementary lens is generally used which is placed in front of the objective unless, of course, one prefers to replace the entire objective by another one. Such a supplementary lens cannot be used in the present case owing to the reflections on the supplementary lens, and also because the attachment of such a supplementary lens would displace the image of the pupil produced by the front system of the objective from the focal point of the rear system. This will nullify the independence of the relation between the optical angle and the lateral distance from the sight deficiency of the eye to be photographed.

The above mentioned independence can be maintained, however, even in case the picture scale is changed when, according to the present invention, a negative lens system or a group of such lens system is provided on the image side of the photographic objective and is rigidly coupled with the axially shiftable image receiving cassette.

The operation of such a dispersing lens or group of lenses in a telecentric system of a photographic objective is as follows:

The picture scale of the supplementary system depends only upon the distance of said system from the image carrier and upon the divergence of the light beam emerging from the side of the image. The distance between the image carrier and the dispersing system will be kept constant by the rigid coupling of the same with one another. Since, furthermore, the angle of incidence in the telecentric system determining the divergence of said light beam emerging from the image side remains the same, the divergence of the angle of emergence and thus the picture scale of the supplementary system will remain constant when an axial displacement of the image carrier together with the supplementary system becomes necessary, because the optical system of the eye to be photographed has a power of refraction which is different from that of the previously photographed eye, or the sight deficiencies and the axial diameters of the eyes are different.

The angle of emergency can be further increased by an additional supplementary dispersing system or a plurality of systems disposed at a fixed distance from the first one. The axial movement of such a combination in the parallel light beam incident from the object will not change the divergence angles of the light beam emerging from each single system.

With a single supplementary system provided in front of the objective on the image side, the picture scale of the camera can be increased by the factor $$k=\frac{f}{f-a}(\text{mm.})$$

In this equation $f$ is the focal length of the system and $a$ is the distance of the main point of the system on the side of the object from the location of the image carrier which the same occupies in the axially shiftable portion of the retina photographing camera without a supplementary system.

The employment of the negative system in the movable portion of the camera will shift the location of the image carrier a distance $s$ in the direction of the light exit. The value of $s$ is $$s=\frac{a^2}{f-a}(\text{mm.})$$

These two equations give the following results:

$$f=\frac{k\cdot s}{k-1}$$

and $$a=\sqrt{\frac{s\cdot f}{k}}$$

Therefore, the supplementary system will maintain the relations between $a$ and $f$ and can be mounted into a readily exchangeable connecting tube which can be positioned in the slidable portion of the camera in front of the image carrier.

In a camera for photographing a retina with a picture scale of 2.5 and a picture angle of 30°, an area of approximately 22.5 millimeter diameter will be photographed upon an image area of 24 x 36 millimeters. A supplementary system with an amplification factor of $k=1.8$ will increase the picture scale to 1:4.5. When two like supplementary systems are arranged one after another, a picture scale of 1:8 will be obtained. The chromatic error of the eye to be photographed remains corrected or compensated even when these supplementary systems are used. Any originally existing curvature of the image area and of an astigmatism connected herewith will be practically removed by the introduction of such negative systems.

A camera for photographing the retina consists generally of a stationary camera portion containing the collecting objective elements and a camera portion movable in axial direction relative to said stationary portion and containing the image receiver, i.e. the film cassette. The connecting element which in accordance with the present invention contains the supplementary negative lens members slides in a tubular extension arranged on the stationary camera portion and is fixedly connected on its other end with a tubular extension on the cassette.

In case the movable camera portion contains a mirror reflex arrangement, the tubular connection elements which contain the negative systems will be inserted behind the mirror and are fixedly connected to two tubular extensions on the mirror reflex arrangement on one hand and on the cassette on the other hand. They will then follow together with the cassette the movements of the entire mirror reflex arrangement.

The present invention will now be described in detail in the accompanying drawing which illustrates an embodiment of a camera for photographing the retina of a human eye.

The stationary portion of the camera consists of a substantially cylindrical housing 1 provided with a tubular extension 1' upon which a tubular extension 2' of the movable camera portion 2 is slidably arranged. The adjustment of the movable camera portion is effected by a rotatable knob 2″ which operates a pinion 2a meshing with a toothed rack 2b. The stationary camera portion 1, 1′ contains the photographic objective consisting of a nonspherical collecting front system $L_1$ and a collecting rear system $L_2$. The distance between the two systems is so selected that the image of the pupil of the eye produced by the front system $L_1$ will coincide with the focus point of the rear system $L_2$ on the side of the object. At this point is arranged an inclined mirror 3 which is provided with an axial aperture 3′. The incident light passing through the tubular portion 4 and coming from a source of light will de deflected by this mirror 3 and directed through the lens system $L_1$ onto the retina of the eye. The image rays coming from the front focal point of the rear lens $L_2$ will be directed by this lens $L_2$ in parallel and will form a parallel light beam on the image side in the movable portion 2 of the camera. The latter contains a mirror reflex arrangement with a tiltable mirror 5 and a stationary mirror 6, an observation eye piece 7, and a cassette 8 receiving the image carrier. The mirror reflex portion and the cassette portion are provided each with a tubular extension by which both portions are connected with each other, or they may also be connected with each other by an intermediate stationary piece 9 which is provided with appropriate connecting means. This intermediate piece contains a negative system $L_3$ (having a focal length $f$) arranged at a distance $a$ from the point indicated by an arrow, which point is normally the place of the image carrier. By means of this system $L_3$ the image is displaced to a position indicated by a further arrow by a distance $s$ which corresponds to the actual length of the intermediate piece 9. The increase of the size of the image obtained is illustrated by the relative length of the arrows. As will be noted, the mirror reflex arrangement with the tubular extension 2′, the connecting piece 9, and the cassette portion 8 form a rigid unitary structure which can be displaced in axial direction relative to the stationary portion 1 of the camera. The dispersing system $L_3$ is hereby positioned in the parallel ray beam. The divergency of the light beams emerging from this system on the image side will not be disturbed by said displacement. Due to the fixed distance between $L_3$ and the image receiver the size of the image will remain independent of any sight deficiency of the eye to be photographed.

What I claim is:

1. In a camera for photographing the retina of the human eye, comprising a stationary camera portion, collecting front and rear optical systems arranged in spaced relation in said camera portion forming a telecentric photographic objective, the space distance between said two collecting systems being selected such that the image of the pupil of said eye produced by said front system coincides with a stop arranged in the focus plane on the object side of said rear system, a movable camera portion on said stationary portion adapted to be displaced axially along the optical axis of said telecentric photographic objective, an image receiving cassette mounted on said movable camera portion, and a negative lens system interposed between said cassette and movable camera portion and within the parallel ray path produced by said telecentric photographic objective, said negative lens system being coupled with said image receiving cassette.

2. A camera according to claim 1 in which said negative lens system is carried by an exchangeable coupling member for connecting the camera cassette with said stationary camera portion, said coupling member being detachably connected to said cassette and telescopically mounted on said stationary camera portion.

3. A camera according to claim 1 including a mirror reflex finder positioned in front of said camera cassette consisting of an inclined tiltable mirror, and an intermediate coupling member arranged between said photographic objective and said cassette in which said negative lens system is mounted, said coupling member being releasably connected with said mirror reflex finder and said cassette.

4. In a photographic camera for photographing the retina of the human eye, comprising a tubular member forming a stationary camera portion, front and rear collecting lens systems mounted in said tubular member providing a telecentric photographic objective, said front and rear collecting systems being spaced a distance such that the image of the pupil of said eye produced by said front system coincides with the stop arranged in the focus plane on the object side of said rear system, a second tubular member telescopically mounted on said first tubular member, a camera casing with its optical axis aligned with the axis of said tubular members, an interchangeable coupling for connecting said camera casing with said second mentioned tubular member, and a negative lens system in said coupling member in the path of the telecentric parallel ray path produced by said photographic objective, said negative lens system being rigidly mounted in said coupling member.

References Cited in the file of this patent

UNITED STATES PATENTS

| | | |
|---|---|---|
| 1,741,526 | Kuhl | Dec. 31, 1929 |
| 2,184,018 | Ort | Dec. 19, 1939 |
| 2,209,532 | Michel | July 30, 1940 |
| 2,552,238 | Turner | May 8, 1951 |
| 2,800,052 | Bechtold | July 23, 1957 |
| 3,016,000 | Noyori | Jan. 9, 1962 |

FOREIGN PATENTS

| | | |
|---|---|---|
| 164,508 | Great Britain | June 13, 1921 |
| 345,102 | Great Britain | Mar. 19, 1931 |
| 782,546 | Great Britain | Sept. 11, 1957 |